Oct. 1, 1940.  C. A. OTTO  2,216,651
CONTROL MECHANISM FOR TEMPERATURE, HUMIDITY, AND THE LIKE
Filed Feb. 3, 1938
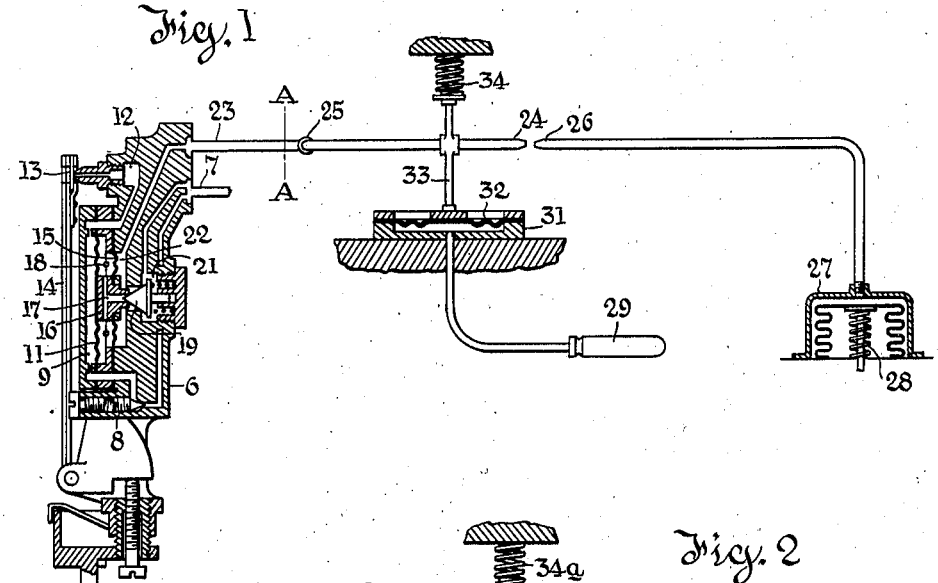
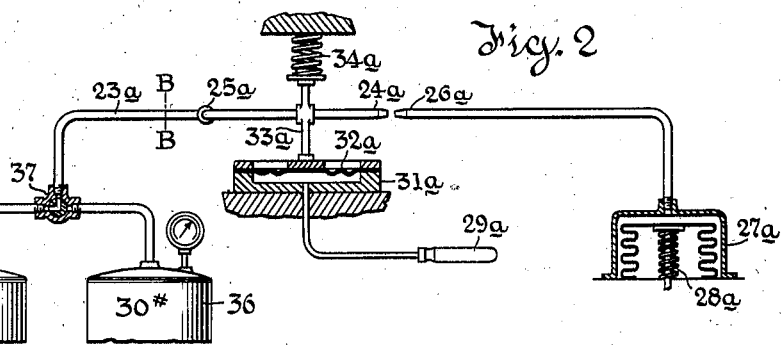
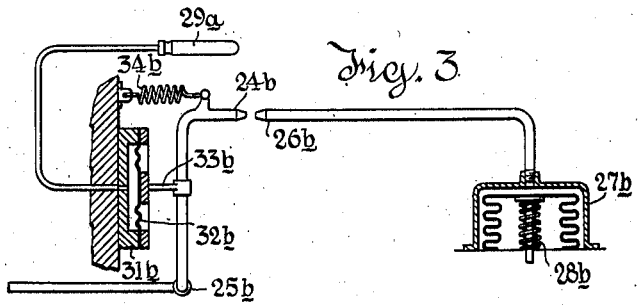
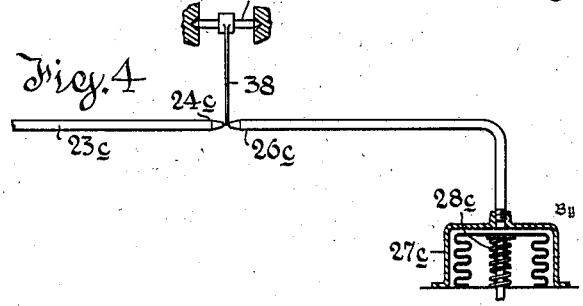
Inventor
Carl A. Otto
Attorneys Patented Oct. 1, 1940

2,216,651

UNITED STATES PATENT OFFICE 2,216,651

CONTROL MECHANISM FOR TEMPERATURE, HUMIDITY, AND THE LIKE

Carl A. Otto, Milwaukee, Wis., assignor to Johnson Service Company, Milwaukee, Wis., a corporation of Wisconsin Application February 3, 1938, Serial No. 188,566

6 Claims. (Cl. 236—79)

This invention relates to the control of atmospheric conditions such as temperature, humidity and the like, and is directed to the automatic control means through which an element or a pair of elements, responsive to atmospheric conditions, exercise a controlling function.

In the air conditioning art various schemes for variably energizing a pressure motor in response to the indication of an element which changes in form or dimension in response to atmospheric conditions, have been used.

One type which has enjoyed some commercial popularity delivers air from a source of air under substantially uniform pressure through a nozzle in such a way as to convert the pressure head of the air so supplied into velocity head. The jet issuing from the nozzle is a free jet for a limited distance, and is directed through an orifice into a pressure motor which controls some apparatus such as a humidifier, a heater, a cooler or other air conditioning apparatus.

An element responsive to an atmospheric condition, such as temperature or humidity, serves to vary the pressure head developed in the motor by the action of the jet. This may be accomplished in a number of ways. The nozzle may be shifted so that the jet is not directed precisely into the orifice leading to the motor, or the nozzle may be moved toward or from the orifice to vary the length of the free path of the jet, or the two effects above mentioned may be combined or an intercepting means may be interposed between the orifice and the jet serving to intercept the jet in a variable degree and thus vary the proportion of the kinetic energy of the jet which is converted into pressure head in the motor. These various means are known in the art and to a certain extent are equivalents.

The present invention is based on the concept that by varying the pressure head on the fluid supplied to the nozzle, the total energy of the jet may be varied. This variation in pressure head may be effected by automatic means which respond to a condition different from that which controls the action of the nozzle, thus producing a modifying control, or a conjoint control in response of two variables.

The phrase "condition different" used above may mean different in kind or different in location, or both. For example, control might be in response to dry bulb temperature at two different places, such as indoors and outdoors, or it might be under control of temperature and humidity at the same place or at different places.

The inventive concept can also be applied to a simple selective control providing selective readjustment of the control point of the responsive device.

A number of different embodiments will now be described with reference to the accompanying drawing in which:

Figure 1 is a sectional view shown largely in diagram, of a control system in which a motor is caused to respond to two different variable quantities;

Fig. 2 is a similar view of a modified system in which a manually set device serves to change the point at which an element responsive to variable quantity responds.

Fig. 3 shows a modification of the nozzle mechanism available for use with either the structures of Fig. 1 or Fig. 2;

Fig. 4 shows another modification; and

Fig. 5 is a detail of the controlling vane shown in Fig. 4.

Reference will first be made to Fig. 1. The supply of pressure to the nozzle is controlled by a relay thermostat of the type shown in the patent to Otto No. 1,500,260, July 8, 1924, but this device is given a special adjustment, different from that normally used, so that it supplies air at all times under a positive but variable pressure.

The body of the thermostat shown at 6 has an air supply 7 through which compressed air from any suitable source is supplied at a pressure slightly higher than the maximum pressure which it is desired to supply to the nozzle hereinafter described. For purposes of discussion we shall assume that the maximum pressure head to be supplied to the nozzle aforesaid is 30 pounds per square inch gage.

From the supply 7, air is fed past a restricting needle valve 8 to a chamber 9 on the front side of the diaphragm 11. A leak port 12 leads from this chamber to the atmosphere and its capacity is varied by a valve 13 which is shifted toward and from the leak port 12 by a thermostatic bar 14. The bar 14 is intended to typify any element responsive to an atmospheric condition.

The diaphragm 11 is connected at its center to a smaller diaphragm 15 by means of the hub member 16 which has an exhaust port 17 discharging into the space between the diaphragms. This space is vented to atmosphere at 18. As the hub 16 is moved inward by pressure on the forward side of the diaphragm, it first engages a combined supply and exhaust valve 19 in such a way that the valve closes the exhaust port 17, after which continued inward movement forces the valve from the supply seat so that air is admitted from the chamber 21 to the chamber 22 behind the diaphragm 15. Chamber 22 is connected with a variable pressure supply line 23 which leads to the nozzle hereinafter described. The chamber 21 is connected with a supply 7, as clearly shown in the drawing.

The parts so far described typify any means available in the art to supply line 23 with fluid under a pressure which varies in response to a variable quantity. An example of such variable quantity is temperature affecting the thermostatic bar 14.

Unlike gradual thermostats as heretofore used under the Otto patent above identified, the needle valve 8 is so adjusted that when the leak port 12 is wide open, a substantial pressure exists in chamber 9. For purpose of discussion, and without implying any limitation, it will be assumed that when the leak port 12 is wide open the pressure in line 23 will be 15 pounds gage, and when the leak port is closed it will be 30 pounds gage. Because of the differential effect of the unequal diaphragms 11 and 15, the pressure in the line 7 should be somewhat above 30 pounds gage.

Line 23 supplies air to a nozzle 24 which is hinged at 25 so as to be movable with a lateral swinging motion into and out of alinement with an orifice 26 connected by a pipe with a bellows motor 27. This motor includes a return spring 28. To shift the nozzle 24 use is made of a thermostatic bulb 29, which in response to varying temperature, develops a varying pressure in the space in housing 31 beneath the flexible diaphragm 32. The center of the diaphragm 32 is connected by link 33 with the nozzle 24. Motion of the diaphragm under pressure developed in the bulb 29 is resisted by a coiled compression spring 34.

The motor 27 is mechanically connected to operate the control mechanism of a heater, cooler, humidifier or other air conditioning apparatus. The primary control is effected by the bulb 29, but the bar 14 exercises a secondary control by varying the pressure head in the line 23 and consequently the velocity head of the jet issuing from the nozzle 24. This offers a simple way to control in response to two variables.

When it is desired to set a thermostat for two control points, as is done for example in the familiar night and day thermostats, I may adopt the arrangement shown in Fig. 2 in which air is supplied at two different pressures. In Fig. 2 I show two reservoirs 35 and 36 which are kept charged at 15 pounds gage and 30 pounds gage, respectively. These are selectively connected by a manually operated, three-way cock 37 with the supply line 23a leading to the nozzle 24a. The remaining parts in Fig. 2 correspond to those in Fig. 1 and are similarly numbered with the letter a.

The parts to the right of the line A—A in Fig. 1, and similarly the parts to the right of the line B—B in Fig. 2, may be modified as indicated in Fig. 3. Parts which correspond to similar parts in Figs. 1 and 2 bear the same reference numerals but with the distinguishing letter b.

The hinge 25b is so arranged that the nozzle 24b moves toward and from the orifice 26, thus varying the length of the free jet between the nozzle and the orifice.

If the radial distance from the nozzle 24b to the pivot 25b be relatively short, the swinging motion of the nozzle will change direction as well as distance, but if the radial distance is increased, the variation of direction can be reduced until it becomes negligible. Thus, Fig. 3 illustrates the mechanical aspects of a construction in which both interval and direction are changed or in which interval alone is changed, the difference being a matter of degree and depending on the radial distance above defined.

In Fig. 3 the spring 34b acts in tension instead of compression, but this is without functional significance as it is possible to arrange springs in any desired manner.

In Figs. 4 and 5 the nozzle 24c has a fixed relationship to the nozzle 26c. The remaining parts, identified by reference numerals with the distinguishing letter c, correspond to similarly numbered parts in the other figures.

The vane 38 mounted on the pivot 39 is arranged to be shifted by a responsive element 29c which corresponds generally to the thermostatic bulbs 29, 29a and 29b of the other figures. The swinging motion of the vane 38 causes it to intercept a variable portion of the jet issuing from the nozzle 24c, and thus varies the pressure developed in the motor 27c.

The power of the motor 27 in Fig. 1, and its analogue in the other figures, may be multiplied by any suitable means, for example, by the relays commonly used in the art, but since no patentable novelty is predicated on the use of a relay it seems unnecessary to describe this structure in detail. As far as the present invention is concerned it suffices to state that its presence is not incompatible with the structure of the present invention.

Generally stated, the present invention is directed to modifying the action of or imposing a secondary control on thermostatic and like devices of the nozzle and orifice type by varying the pressure head of the pressure fluid supplied to the nozzle for the purpose of varying the total velocity head of the jet issuing from the nozzle.

Various forms of the nozzle and orifice control are known, and several have been illustrated. The drawing and description are meant to be exemplary and not limiting, the scope of the invention being defined in the claims.

I claim:

1. The method of regulating a device for conditioning the atmosphere which consists in forming a jet of fluid having energy in the form of velocity head; varying said velocity head in accordance with an atmospheric condition; converting a portion of said velocity head into pressure head; varying the portion so converted in accordance with another atmospheric condition; and regulating said conditioning device by variation of the resulting pressure head.

2. The method of controlling a device for conditioning the atmosphere which comprises directing a free jet of fluid under velocity head through an orifice into a closed chamber, whereby pressure is developed in the chamber; controlling said device by changes of chamber pressure; and concurrently changing the chamber pressure in accordance with changes in two atmospheric conditions by varying said velocity head in accordance with one condition, and the coaction of the jet with the orifice in accordance with the other condition.

3. Means for actuating dampers, valves and the like comprising in combination, a pressure motor having an orifice; a nozzle adapted to direct a free jet of pressure fluid into said orifice whereby fluid pressure is developed in said motor; means for supplying fluid under pressure to said nozzle; means responsive to an atmospheric condition for varying the coaction of said nozzle and orifice whereby the pressure in the motor is varied; and means for concurrently varying the pressure under which fluid is supplied to said nozzle.

4. Means for actuating dampers, valves and the like comprising in combination, a pressure motor having an orifice; a nozzle adapted to direct a free jet of pressure fluid into said orifice whereby fluid pressure is developed in said motor; means for supplying fluid under pressure to said nozzle; means responsive to an atmospheric condition for varying the coaction of said nozzle and orifice whereby the pressure in the motor is varied; and means responsive to a different atmospheric condition for concurrently varying the pressure under which fluid is supplied to said nozzle.

5. Means for actuating dampers, valves and the like comprising in combination, a pressure motor having an orifice; a nozzle adapted to direct a free jet of pressure fluid into said orifice whereby fluid pressure is developed in said motor; means for supplying fluid under pressure to said nozzle; means responsive to an atmospheric condition for shifting said nozzle relatively to said orifice whereby the pressure in the motor is varied; and means for concurrently varying the pressure under which fluid is supplied to said nozzle.

6. Means for actuating dampers, valves and the like comprising in combination, a pressure motor having an orifice; a nozzle adapted to direct a free jet of pressure fluid into said orifice whereby fluid pressure is developed in said motor; means for supplying fluid under pressure to said nozzle; means responsive to an atmospheric condition for intercepting a portion of the jet directed by said nozzle toward said orifice whereby the pressure in the motor is varied; and means responsive to a different atmospheric condition for concurrently varying the pressure under which fluid is supplied to said nozzle.

CARL A. OTTO.